United States Patent [19]

Bellegarda et al.

[11] Patent Number: 5,544,261
[45] Date of Patent: Aug. 6, 1996

[54] AUTOMATIC HANDWRITING RECOGNITION USING BOTH STATIC AND DYNAMIC PARAMETERS

[75] Inventors: Jerome R. Bellegarda, Goldens Bridge; David Nahamoo, White Plains; Krishna S. Nathan, New York, all of N.Y.

[73] Assignee: International Business Machines Corporation, Armonk, N.Y.

[21] Appl. No.: 450,556

[22] Filed: May 25, 1995

Related U.S. Application Data

[62] Division of Ser. No. 9,515, Jan. 27, 1993, Pat. No. 5,491,758.

[51] Int. Cl.⁶ .................................................. G06K 9/00
[52] U.S. Cl. .................................. 382/187; 382/195
[58] Field of Search ........................ 382/186, 187, 382/188, 189, 190, 195, 196, 202, 207, 215, 159, 160, 161, 111, 123, 225

[56] References Cited

U.S. PATENT DOCUMENTS

| | | | |
|---|---|---|---|
| 4,903,312 | 2/1990 | Sato | 382/21 |
| 5,005,205 | 4/1991 | Ellozy et al. | 382/3 |
| 5,058,182 | 10/1991 | Kuan et al. | 382/25 |
| 5,105,468 | 4/1992 | Guyon et al. | 382/14 |
| 5,115,512 | 5/1992 | Fan et al. | 382/3 |
| 5,265,174 | 11/1993 | Nakatsuka | 382/13 |
| 5,343,537 | 8/1994 | Bellegarda et al. | 382/13 |

FOREIGN PATENT DOCUMENTS

| | | |
|---|---|---|
| 3822671A1 | 11/1990 | Germany. |
| 2190778 | 11/1987 | United Kingdom. |
| WO92/05517 | 4/1992 | WIPO. |

OTHER PUBLICATIONS

C. Tappert, et al., "The State of the Art in On–Line Handwriting Recognition", IEEE, vol. 12, No. 8, pp. 787–808, Aug. 1990. 055422588

*Primary Examiner*—Leo Boudreau
*Assistant Examiner*—Phuoc Tran
*Attorney, Agent, or Firm*—Perman & Green

[57] ABSTRACT

Methods and apparatus are disclosed for recognizing handwritten characters in response to an input signal from a handwriting transducer. A feature extraction and reduction procedure is disclosed that relies on static or shape information, wherein the temporal order in which points are captured by an electronic tablet may be disregarded. A method of the invention generates and processes the tablet data with three independent sets of feature vectors which encode the shape information of the input character information. These feature vectors include horizontal (x-axis) and vertical (y-axis) slices of a bit-mapped image of the input character data, and an additional feature vector to encode an absolute y-axis displacement from a baseline of the bit-mapped image. It is shown that the recognition errors that result from the spatial or static processing are quite different from those resulting from temporal or dynamic processing. Furthermore, it is shown that these differences complement one another. As a result, a combination of these two sources of feature vector information provides a substantial reduction in an overall recognition error rate. Methods to combine probability scores from dynamic and the static character models are also disclosed.

2 Claims, 14 Drawing Sheets

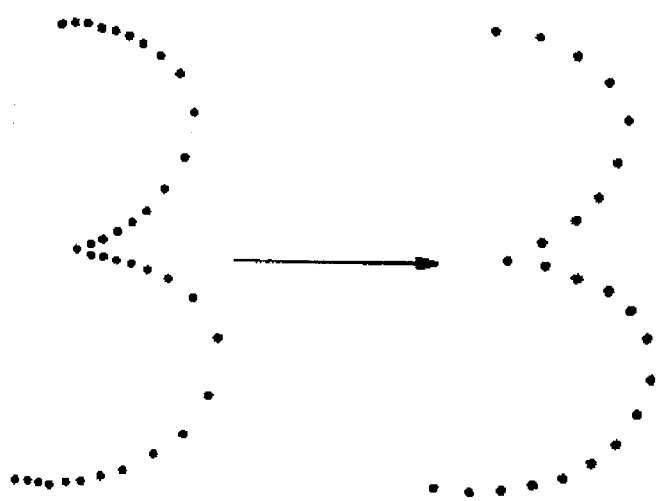
BALLISTICALLY SPACED
FIG. 5
EQUALLY SPACED
FIG. 6
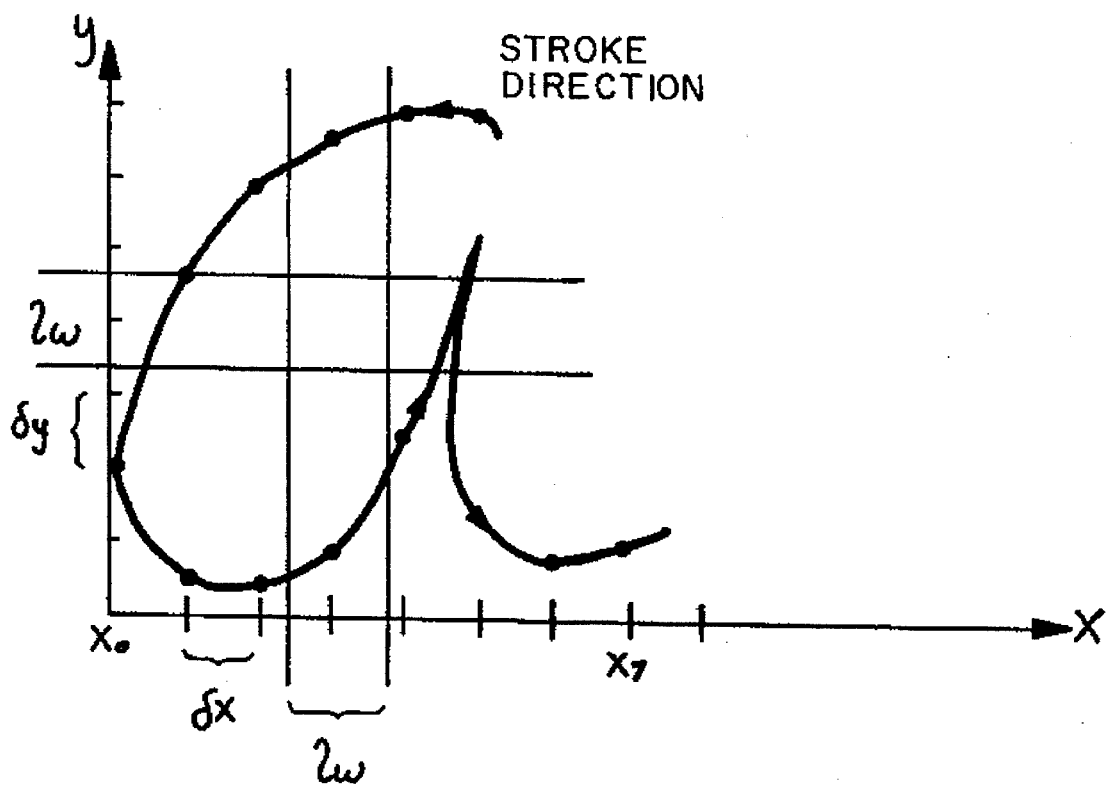
FIG. 9

FIG. 12

LOCAL FEATURES:
- $\Delta x_m = x_m - x_{m-1}$
- $\Delta y_m = y_m - y_{m-1}$
- $\cos \theta_m = (x_{m+1} - x_{m-1}) / \sqrt{(x_{m+1} - x_m)^2 + (y_{m+1} - y_m)^2}$ } ESTIMATE OF SLOPE AT CURRENT POSITION
- $\sin \theta_m = (y_{m+1} - y_{m-1}) / \sqrt{(x_{m-1} - x_m)^2 + (y_{m+1} - y_m)^2}$
- $\cos \theta_{m+1} - \cos \theta_{m-1}$ } ESTIMATE OF CURVATURE AT CURRENT POSITION
- $\sin \theta_{m+1} - \sin \theta_{m-1}$

FIG. 14

GLOBAL FEATURES:
- $y_m$
- $x_m - x_i$
- $\text{gap dist} = \sqrt{(x_k - x_j)^2 + (y_k - y_j)^2}$   INTERSTROKE DISTANCE

AUTOMATIC HANDWRITING RECOGNITION USING BOTH STATIC AND DYNAMIC PARAMETERS

This is a divisional of application Ser. No. 08/009,515 filed on Jan. 27, 1993, now U.S. Pat. No. 5,491,758.

FIELD OF THE INVENTION

This invention relates to apparatus and methods for automatically recognizing handwriting.

BACKGROUND OF THE INVENTION

Symbols formed by handwriting, when traced on an electronic tablet, are represented by sequences of x–y coordinate pairs. A fundamental unit of handwriting is the stroke. A stroke is considered as a sequence of points, represented by their respective x–y coordinates. Symbols, such as letters of the alphabet and numbers, are assemblages of such strokes.

Desirable features of an automatic handwriting recognition system include an ability to process the input data so as to minimize redundancies, and to also model the data by means of robust statistical techniques. Parameters that are considered are typically dependent on the direction of pen movement. That is, the temporal order of the points is preserved when deriving feature vectors. The rational for preserving the temporal ordering of the stroke data is that there is a degree of consistency in the way characters are formed by a given writer. For example, the letter "O" may be written either in a clockwise or counter-clockwise motion. By allowing for these two possibilities, and retaining the direction of pen movement, it is possible to design a recognition system that is robust with respect to noise because the overall temporal trace of the system is not affected by small fluctuations. Furthermore, it is often possible to distinguish between similar shapes, such as an 'S' formed with one stroke and a '5' that is formed with two strokes, by virtue of the number of strokes and/or the direction of pen movement.

However, a handwriting recognition system that is dependent solely upon stroke order may exhibit certain deficiencies. One such deficiency is a difficulty in properly handling delayed strokes, such as the crossing of a 't' and the dotting of an 'i' or a 'j'. Retraces of characters may also present difficulties. Another deficiency of handwriting recognition systems that process only temporal, or dynamic, input data is an ambiguity that is introduced when modeling multi-stroke characters, such as capital letters. This ambiguity exists because the number of representations of such multi-stroke characters increases geometrically with the number of strokes. Finally, there may be little consistency among different writers in the direction of pen movement. It is therefore necessary to incorporate a large number of character prototypes or templates, to achieve reasonable writer independent recognition performance. However, the use of a large number of templates increases both the memory requirements of the handwriting recognition system and also the processing time that is required to search through the templates to find a most probable match with an input character.

It is an object of this invention to provide a handwriting recognition system that employs both dynamic (temporal) feature vectors and static (spatial) feature vectors when recognizing handwriting.

A further object of this invention is to provide a handwriting recognition method and apparatus that operates in a parallel manner to simultaneously provide both dynamic and static feature vectors in response to input signals from a handwriting transducer.

Another object of this invention is to provide a method and apparatus for deriving static feature vectors that are usable both with on-line, real time handwriting recognition techniques and also with off-line, non-real time techniques, such as in optical character recognition systems.

SUMMARY OF THE INVENTION

The foregoing and other problems are overcome and the objects of the invention are realized by methods and apparatus for the automatic recognition of handwritten text that employs the use of both dynamic and static parameters. It is shown that the errors produced by these two methods are to a great extent orthogonal and, consequently, a combination of the two sets of parameters greatly reduces the overall handwriting recognition error rate.

The teaching of this invention resolves some of the problems associated with dynamic feature selection, while at the same time retaining the major advantages of dynamic feature selection. A feature extraction and reduction procedure is disclosed that relies principally on the static or shape information, wherein the temporal order in which the points are captured by the tablet may be disregarded. Thus, only the shape of the character is considered. This is achieved by generating and processing the data with three independent sets of feature vectors which encode the shape information of the input character information. These feature vectors include horizontal (x-axis) and vertical (y-axis) slices of a bit-mapped image of the input character data, and an additional feature vector to encode an absolute y-axis displacement from a baseline of the bit-mapped image.

It is shown that the recognition errors that result from the spatial or static processing are quite different from those resulting from temporal or dynamic processing. Furthermore, it is shown that these differences complement one another. As a result, a combination of these two sources of feature vector information provides a substantial reduction in an overall recognition error rate. It is also shown that the method of this invention works well both for writer dependent and writer independent recognition modes. In the latter case, the resulting accuracy is significantly improved over that obtained with refined dynamic modeling techniques.

The method of this invention is logically divided into two operations. A first operation is a training phase wherein estimates of the parameters of a character model are obtained. A second operation is a decoding phase which recognizes incoming unknown handwriting-generated signals. Methods to combine probability scores from the dynamic and the static character models are also disclosed.

BRIEF DESCRIPTION OF THE DRAWINGS

The above set forth and other features of the invention are made more apparent in the ensuing Detailed Description of the Invention, when read in conjunction with the attached Drawings, wherein:

FIG. 5 illustrates a ballistically spaced character which in input to the pre-filtering block of FIG. 4;

FIG. 6 illustrates an equally spaced character which is output from the pre-filtering block of FIG. 4;

FIG. 9 illustrates a sampled character for which a spatial feature vector is obtained;

FIG. 12 illustrates a six dimensional local parameter vector generated for the point (P) of FIG. 11 by collecting a plurality of local spatial attributes;

FIG. 14 illustrates a three dimensional global parameter vector generated for the point (P) of FIG. 13 by collecting a plurality of global spatial attributes;

DETAILED DESCRIPTION OF THE INVENTION

A presently preferred embodiment of this invention employs techniques to process handwriting input, specifically dynamic (temporal) processing of the handwriting input, that are disclosed in commonly assigned U.S. patent application Ser. No. 07/785,642, filed Oct. 31, 1991, now U.S. Pat. No. 5,343,537, entitled "A Statistical Mixture Approach to Automatic Handwriting Recognition" by J Bellagarda, E Bellagarda, D Nahamoo and K. Nathan. The present invention extends this teaching by the use of static, shape-based character feature vectors, and by a combination of static and dynamic feature vectors.

Figure 1:
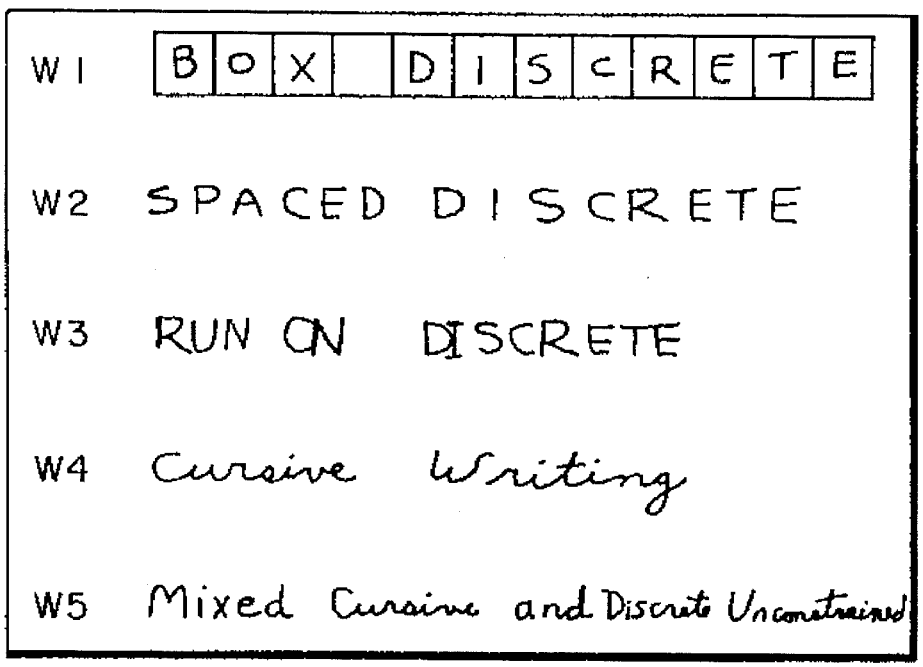
FIG. 1 provides examples of five different types of handwriting.

In handwriting recognition, handwritten characters generally fall into five groups depicted in FIG. 1, the groups being depicted in increasing order of recognition complexity. Specifically, these groups include a first type of writing (W1) known as box discrete wherein individual characters are formed within predefined areas, or boxes, thereby simplifying the task of character segmentation. A second type of writing (W2) is known as spaced discrete wherein the user intentionally forms each character such that no character touches another. A third type of writing (W3) is known as run-on discrete wherein the user may form characters that touch or "run-on" to, one another. A fourth type of writing (W4) is cursive writing where the user normally writes the whole word as a series of connected letters, and then subsequently crosses the t's and dots the i's and j's. Finally, a fifth type of writing (W5) is unconstrained writing wherein the user may use a mixture of run-on and cursive writing. The last type is most difficult and presents the most complex segmentation and recognition task of the five styles depicted in FIG. 1.

Figure 2:
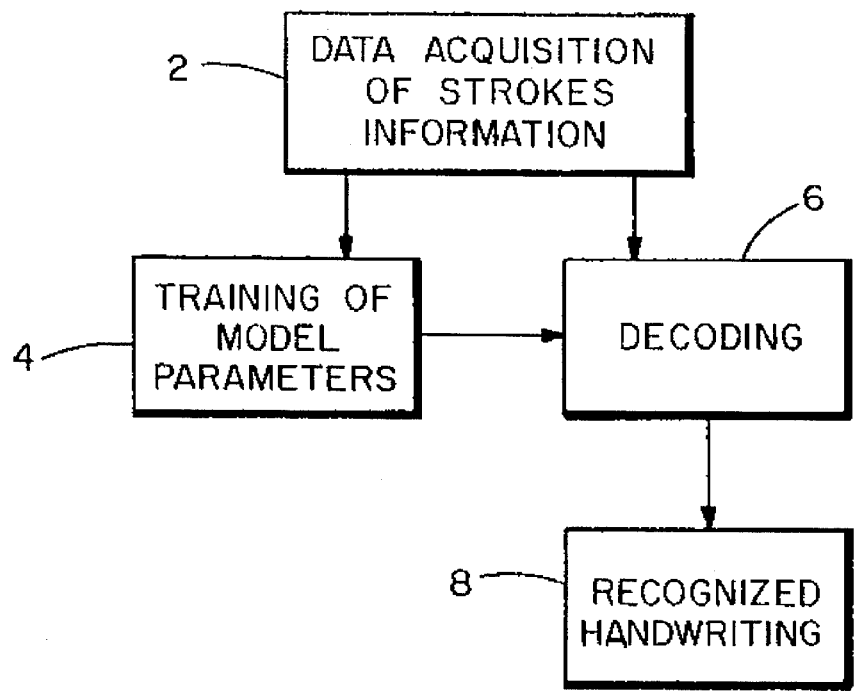
FIG. 2 is a block diagram of a generalized handwriting recognition system emphasizing training and decoding paradigms.

Referring to FIG. 2 there is illustrated, in block diagram form, a handwriting recognition system that is constructed in accordance with this invention. A generalized discussion of FIG. 2 is first provided, followed by a detailed description of the operation of each of the blocks shown therein. At block 2 there occurs data acquisition of stylus or pen stroke information. Acquired strokes are operated on to recognize the handwriting information. During a training mode of operation, as shown at block 4, the acquired handwriting information is analyzed, in reference to a known, training script, to train the underlying models purporting to represent this information. During use, the model parameters obtained during training are used by decoding block 6, together with feature vectors corresponding to the (unknown) handwriting to be recognized.

Recognized handwriting is thereafter made available for use by block 8. By example, a recognized message may be simply converted to an alphanumeric format and displayed upon a display device. The recognized message may also be provided to any application that would conventionally receive messages from a keyboard such as, by example, a word processing system.

Figure 3:
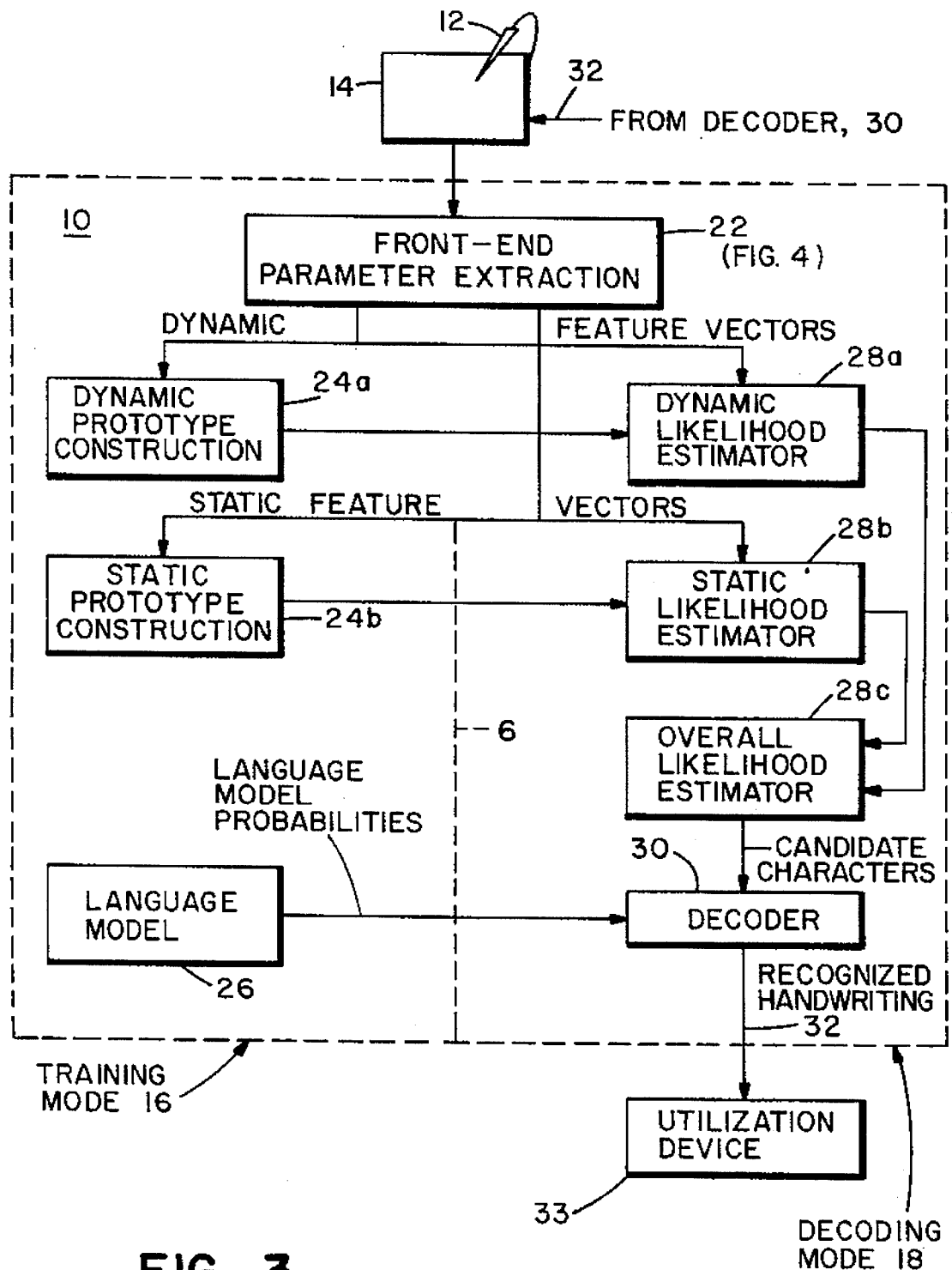
FIG. 3 is a block diagram of a handwriting recognition system according to the present invention.

FIG. 3 is a block diagram of a handwriting recognition system that implements the methods of the invention that are described below. A data processing system 10, which for any example may be an IBM 3090/VF or an IBM RS 6000, receives character or stroke information produced by a user using a handwriting transducer, typically a stylus 12 that writes on an electronic tablet 14. The character or stroke information may be displayed on the electronic tablet 14 or another display device (not shown). The computer 10 can be used either in a training mode 16 or in a decoding mode 18.

In either the training mode 16 or the decoding mode 18 a front-end parameter extraction block 22 is employed. In accordance with this invention, the front-end parameter extraction block is operable for extracting both dynamic (temporally-based) feature vectors and also static (shape-based or spatially-based) feature vectors from the output of the tablet 14.

In the training mode 16 the system includes a dynamic prototype construction block 24a and also a static prototype construction block 24b. In the decoding mode 18 the system includes a dynamic likelihood estimator 28a, a static likelihood estimator 28b, an overall (combined) likelihood estimator 28c, and a decoder 30 that operates with a language model block 26.

The blocks 22–30 are shown as functional program modules, however, it is to be appreciated that some or all of these functional blocks may be implemented in hardware form instead of software form.

The front-end parameter extraction block 22 provides dynamic and static feature vectors to the prototype construction blocks 24a and 24b, respectively, during the training mode 16, or to the likelihood estimator blocks 28a and 28b, respectively, during the decoding mode 18.

Dynamic Feature Vector Extraction

With respect to dynamic feature vector extraction, the parameter extraction block 22 operates in accordance with the following nine method steps.

1. Perform a pre-filtering of the data to normalize for the speed of writing. This is accomplished by converting the time-dependent representation captured by the tablet 14, where the spacing between points is ballistic in nature, into a time-independent representation, where all the points are equally spaced. Linear-interpolation is performed as necessary to find the resulting equally spaced points. If desired, a cubic spline interpolation can also be performed for a more refined interpolation.

2. For each point $P_n$ of coordinate $(x_n, y_n)$ in the training data, form a P-dimensional vector $\vec{p}_n$ of feature elements representative of the local pen trajectory around $P_n$. For example, a good choice for P is 6, with feature elements given by:
   (i) the horizontal and vertical incremental changes:

$$\Delta x_n = x_n - x_{n-1}, \Delta y_n = y_n - y_{n-1};$$

(ii) the sine and cosine of the angle of the tangent to the pen trajectory at $P_n$:

$$\cos\theta_n = \frac{\Delta x_n}{\sqrt{(\Delta x_n)^2 + (\Delta y_n)^2}},$$

$$\sin\theta_n = \frac{\Delta y_n}{\sqrt{(\Delta x_n)^2 + (\Delta y_n)^2}};$$

and
   (iii) the incremental changes in the above two parameters:

$$\Delta\cos\Theta_n = \cos\Theta_{n+1} - \cos\Theta_{n-1}, \Delta\sin\Theta_n = \sin\Theta_{n+1} - \sin\Theta_{n-1}.$$

It should be noted that the last two parameters provide information about the curvature of the pen trajectory at point $P_n$.

3. For each point $P_n$ of coordinates $(x_n, y_n)$ in the training data, form a P'-dimensional vector $\vec{p}'_n$ of feature elements representative of the global pen trajectory up to $P_n$. For example, a good choice for P' is 3, with feature elements given by: (i) the height from the baseline $y_n$, (ii) the width from the beginning of the stroke $x_n - x_i$, where $x_i$ is the first coordinate of the current stroke, and (iii) the inter-stroke distance if the current character is composed of more than one stroke.

4. For each stroke in the training data, determine a subset of the points $P_n$ in that stroke say $Q_i$, with the property that the $Q_i$'s are approximately equally spaced. This set includes the first and last points of each stroke, and the spacing interval is some reasonable function of the line height.

5. At each location $Q_i$ obtained in Step 4, construct a Q-dimensional spliced vector by concatenating together the H vectors $\vec{p}_n$ preceding $Q_i$ the vector $\vec{q}_i$ corresponding to $Q_i$, and the H vectors $\vec{p}_n$ following $Q_i$. Similarly, construct a Q'-dimensional spliced vector by concatenating together the H' vectors $\vec{p}_n$ preceding $Q_i$, the vector $\vec{q}_i$ corresponding to $Q_i$ and the H' vectors $\vec{p}'_n$ following $Q_i$. This is realizable provided the following is true:

$$Q = P(2H+1), Q' = P'(2H'+1).$$

Suitable choices are H=H'=20, yielding values Q=246 and Q'=123.

6. compute the mean vector and covariance matrix of all the Q-dimensional vectors corresponding to local handwriting features. Denote these as $M_t^{(1)}$ and $S_t^{(1)}$, respectively. Similarly, compute the means vector and covariance matrix of all the Q'dimensional vector corresponding to global handwriting features. Denote these are $M_t^{(2)}$ and $S_t^{(2)}$, respectively.

7. For n=1,2 compute $E_t^{(n)}$, the eigenvector matrix of $S_t^{(n)}$, and $\Lambda_t^{(n)}$, the diagonal matrix of corresponding eigenvalues. It is noted that these quantities obey the relationship:

$$S_t^{(n)} = E_t^{(n)} \Lambda_t^{(n)} E_t^{(n)T},$$

where T denotes matrix transposition. Thus, the leading eigenvectors in $E_t^{(n)}$ correspond to the leading eigenvalues in $\Lambda_t^{(n)}$.

8. Using the $R_1$ leading eigenvectors from Step 7, project the Q-dimensional feature vectors of Step 5 onto a space of dimension $R_1$. Designate the resulting vectors $\vec{r}_i^{(1)}$. A reasonable value for $R_1$ is 6. At this point the redundancy present in the Q-dimensional spliced feature vectors has been eliminated by concentrating on the most informative feature elements. The space spanned by the vectors $\vec{r}_i^{(1)}$ is referred to as the chirographic space $C^{(1)}$.

9. Similarly, using the $R_2$ leading eigenvectors from Step 7, project the Q'-dimensional feature vectors of Step 5 onto a space of dimension $R_2$, with resulting vectors $\vec{r}_i^{(2)}$. A reasonable value for $R_2$ is 15. Note that $R_2 > R_1$ because there is generally less redundancy present in the (global features) Q-dimensional spliced feature vectors than in the (local features) Q-dimensional spliced feature vectors. The space spanned by the vectors $\vec{r}_i^{(2)}$ is referred to as the chirographic space $C^{(2)}$.

The prototype construction block 24a performs the following Steps 10–14 of the handwriting recognition method to produce (i) chirographic prototypes representing suitable portions of characters and (ii) mixture coefficients indicating how to combine the chirographic prototypes. This information is used in the decoding mode to determine, or recognize, unknown characters. The language model block 26 provides language model probabilities which may be used to determine what characters are most likely to occur in a given context.

Dynamic prototype construction method Steps 10–15 are set forth below.

10. Repeat this step for n=1,2. Starting with random cluster assignments, perform K-means Euclidean clustering of the projected vectors $\vec{r}_i^{(n)}$ obtained in Steps 8 and 9, so as to obtain preliminary prototype distributions in the corresponding $R_n$-dimensional chirographic space.

11. Repeat this step for n=1,2. Starting with the preliminary distributions of Step 10, perform K-means Gaussian clustering of the projected vectors $\vec{r}_i^{(n)}$ obtained in Steps 8 and 9, so as to obtain final Gaussian prototype distributions in both chirographic spaces. Denote these prototype distributions as $\pi_k^{(n)}$ and use cluster sizes to estimate the prior probability $Pr(\pi_k^{(n)})$ of each prototype distribution in the respective $R_n$-dimensional chirographic space.

12. Repeat this step for n=1,2. Using the Gaussian distributions from Step 11, compute, for all vectors $\vec{r}_i^{(n)}$ (n) obtained in Steps 8 and 9, the quantity $Pr(\vec{r}_i^{(n)}|\pi_k^{(n)})$. Also estimate the probability of each feature vector as:

$$Pr(\vec{r}_i^{(n)}) = \sum_{k=1}^{K_n} Pr(\vec{r}_i^{(n)}|\pi_k^{(n)})Pr(\pi_k^{(n)}),$$

assuming the total number of clusters in the respective chirographic space is $K_n$. Good choices are $K_1=K_2=400$.

13. Repeat this step for n=1,2. Using the results of Steps 11 and 12, compute the quantity:

$$Pr(\pi_k^{(n)}|\vec{r}_i^{(n)}) = \frac{Pr(\vec{r}_i^{(n)}|\pi_k^{(n)})Pr(\pi_k^{(n)})}{Pr(\vec{r}_i^{(n)})},$$

and note against which character $a_j$, in the vocabulary considered, that each vector $\vec{r}_1^{(n)}$ is aligned with in the training data.

14. Repeat this step for n=1,2. For each character $a_j$ in the vocabulary considered, pool together all the $\vec{r}_i^{(n)}$ which have been aligned against it and accumulate the corresponding $Pr(\pi_k^{(n)}|\vec{r}_i^{(n)})$. After normalization, this provides an estimate of $Pr(\pi_k^{(n)}|a_j)$, the prior probability of each prototype distribution in the respective chirographic space given each character $a_j$. This completes the training phase.

15. Repeat steps 1–5 and 8–9 on test data, so as to produce test feature vectors in the same respective chirographic spaces as the training data.

In the absence of the static feature vector determination that is described in detail below, the following Step 16 is employed to recognize a most likely character that the dynamic feature vectors represent. More specifically, during the recognition mode the dynamic likelihood estimator 28a, which performs Step 16 of the handwriting recognition method, receives dynamic feature vectors from block 22 which have been produced from the unknown strokes or characters to be recognized. These dynamic feature vectors lie in the same chirographic space(s) as the chirographic prototypes from block 24a, and can therefore be compared to each of them to evaluate the contribution of each of them to each particular feature vector. This information is integrated using the mixture coefficients produced during training to compute the likelihood that each particular feature vector "belongs" to a character in the alphabet. Over all the feature vectors, this can be used to produce candidate characters for recognition to decoder 30. Decoder 30 integrates into the overall score the language model probabilities from block 26 corresponding to the maximum score. Recognized handwriting is then produced at output 32 of decoder 30. The recognized handwriting may be displayed on the tablet 14, or may be provided to a utilization device 33, which for example may be a display device, printer, application program or the like.

16. For each frame of data fi represented in the chirographic space $C^{(1)}$ by $\vec{r}_i^{(1)}$ and in the chirographic space $C^{(2)}$ by $\vec{r}_i^{(2)}$, use the Gaussian mixture distributions obtained in Step 11 and the prior probabilities obtained in Step 14 to form the quantity:

$$Pr(f_i|a_j) = Pr(\vec{r}_i^{(1)}|a_j)Pr(\vec{r}_i^{(2)}|a_j) =$$

$$\sum_{k=1}^{k_1} Pr(\vec{r}_i^{(1)}|\pi_k^{(1)})Pr(\pi_k^{(1)}|a_j)^{1-\alpha-k_2} \sum_{k=1}^{} Pr(\vec{r}_i^{(2)}|\pi_k^{(2)})Pr(\pi_k^{(2)}|a_j)^\alpha,$$

i.e., the weighted product of two single Gaussian mixture distributions covering the entire chirographic label alphabet. In this expression, alpha controls the influence of the second codebook relative to the first. A suitable value for alpha is 0.7. It remains to multiply the scores of successive frames to obtain the overall score for a tentative sequence of frames, thus completing the decoding process for the case where only dynamic feature vectors are employed.

However, an important aspect of this invention is the use of static feature vectors to complement the dynamic feature vectors that are described above. As such, the operation of the system 10 for deriving and using both static and dynamic feature vectors is described below with respect to a presently preferred method of the invention.

Static Feature Vector Extraction

Figure 10:
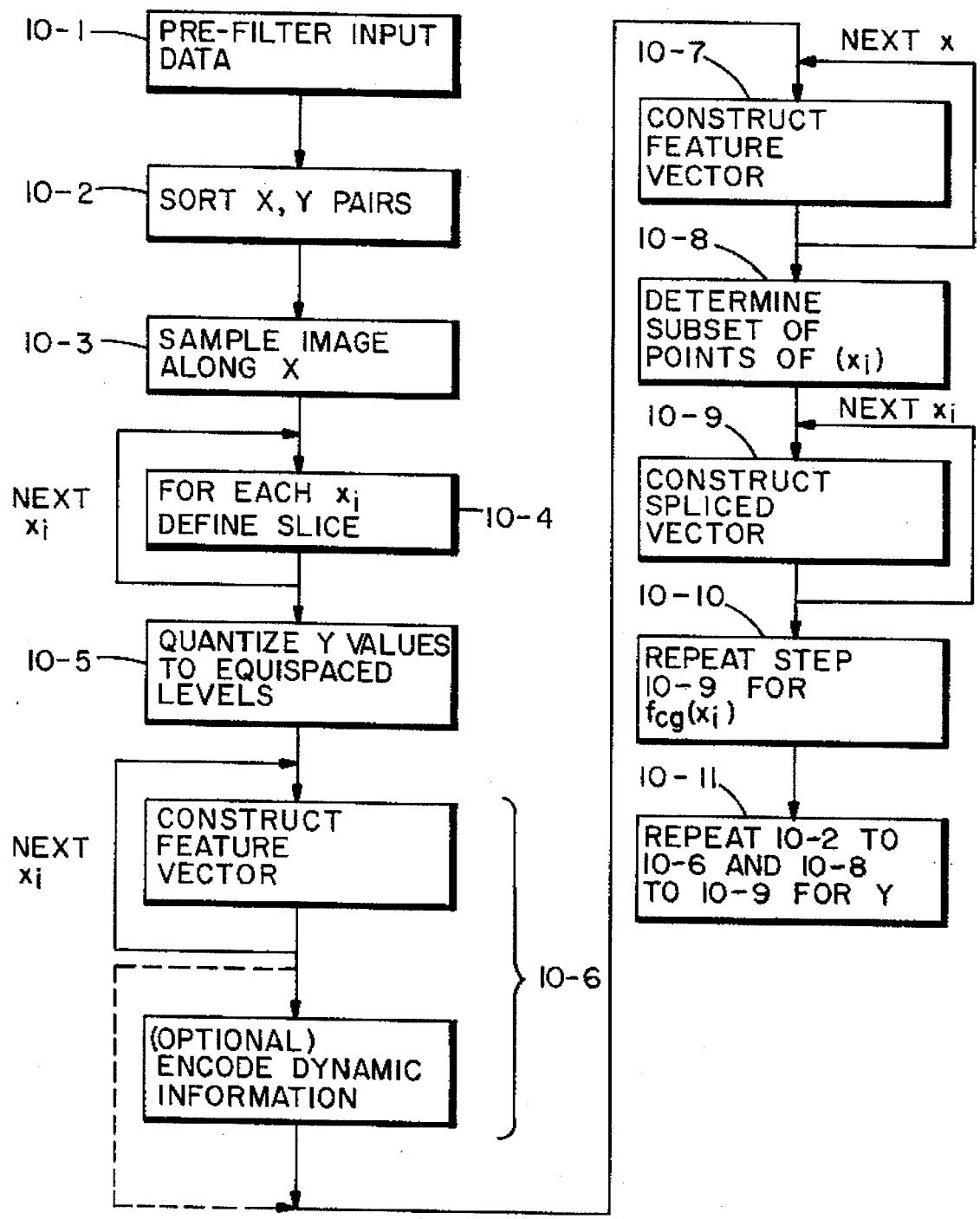
FIG. 10 is a flow chart illustrating a spatial feature vector extraction method.

Reference is made to the flow chart of FIG. 10 for the description of Steps 1–11, wherein the blocks are designated as 10-1 for Step 1, 10-2 for Step 2, etc.

1. Increase the resolution of the x and y traces obtained by the tablet 14 by interpolating by means of cubic splines. This step corresponds to, and may be performed in an identical fashion to, the Step 1 of the dynamic feature vector extraction method described above.

Figure 4:
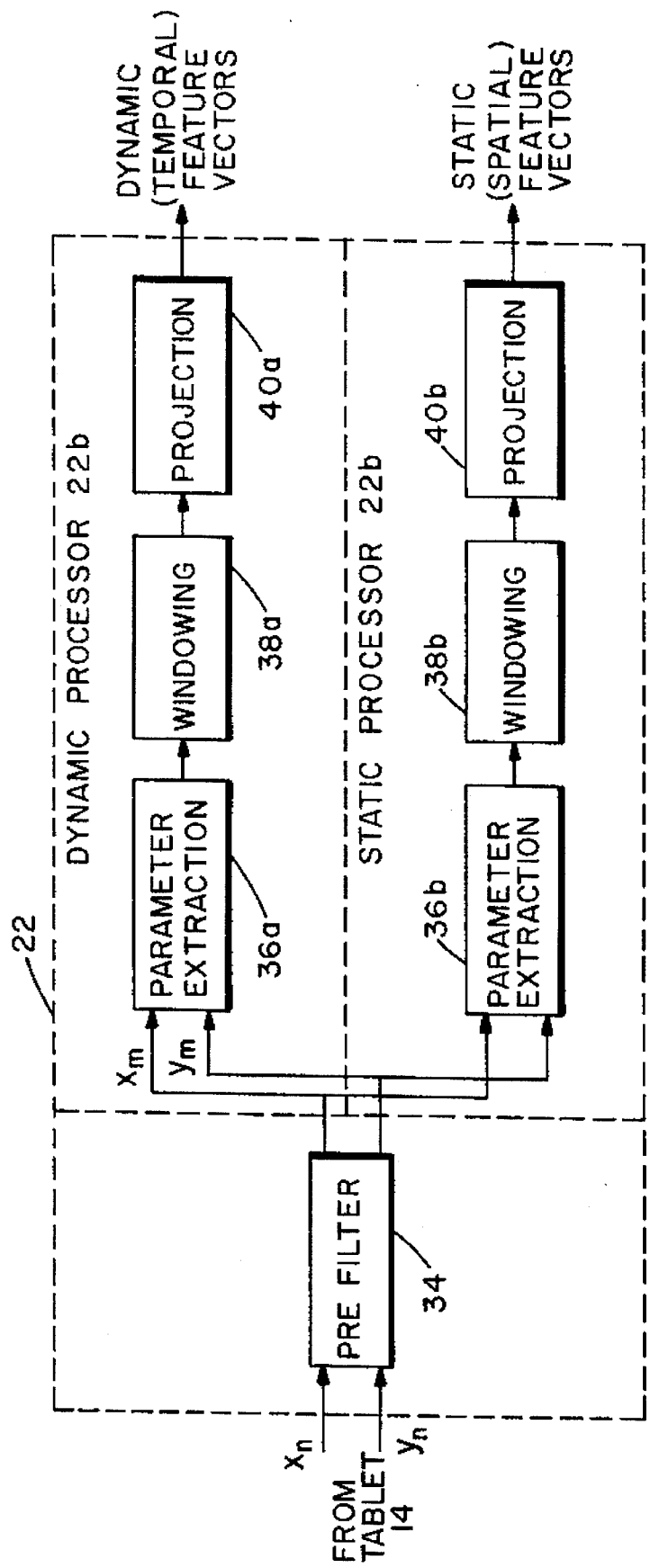
FIG. 4 is a detailed block diagram of the front-end parameter extraction block which is shown generally in FIG. 3.

The following Steps 2–11 describe the operation of the front-end parameter extraction block 22 when extracting static feature vectors, specifically blocks 36b, 36c, and 36d of FIG. 4. Reference is also made to sample handwritten character "a" that is shown in FIG. 9.

2. Sort the resulting x,y pairs in terms of ascending x values. This enforces a left to right structure on the input text. Alternately, a right to left structure can be imposed on the input text by sorting in terms of descending x values.

3. Sample the image along the x direction at intervals of $\delta x$. This yields a sequence of the form $\{x_i\}$, where $x_i = x_{i-1} + \delta x$.

4. For each sample point $x_i$ define a slice of width 1w centered on that sample. Associate all y values within this width with that sample. A reasonable value for lw is 1.5 δx. This yields a vector of the form $\vec{y}(x_i)$.

5. Quantize the range of y values to $n_y$ equispaced levels, $l_k$. For each $x_i$ assign all y's associated with it to one of these levels; i.e.

$$y \in l_k \Leftrightarrow l_{k-1}\Delta l < y < l_k \Delta l,$$

where $\Delta l = (ymax-ymin)/n_y$. A reasonable value for $n_y$ is 8.

6. For each $x_i$ construct a feature vector $\vec{f}x(x_i)$ of length $n_y$, such that the kth element is one if at least one y was assigned to $l_k$, and zero otherwise. This can be viewed as constructing a bitmap of the slice with grid size $n_y$. It should be noted that it is also possible to encode some dynamic information within the static framework by defining three possible states for each element of $f_x(x_i)$. That is, (0,0) in the absence of a point, (−d,1) for a point with a left to right stroke direction and (d,1) for a point with a right to left stroke direction. This is meaningful provided that d is less than the square root of ⅓. The choice of d affects the degree to which the temporal information is utilized. This tri-state parameterization of the bitmap results in an increase in performance. This representation simultaneously embodies both spatial and temporal information. It is also possible to encode additional information regarding the stroke direction in this fashion, e.g., to quantify the angle of the stroke (Freeman coding).

7. For each $x_i$, construct another feature vector of length 1, $f_{cg}(x_i)$ such that:

$$f_{cg}(x_i) = \frac{1}{J} \sum_{j=1}^{J} y_j(x_i),$$

where the summation is over all y's within the slice associated with $x_i$.

8. Determine a subset of points of $\{x_i\}$ such that the points are spaced Δx apart. Define these points as $\{X_i\}$. By example, Δx is taken to be 1.5 δx.

9. At each location $X_i$ construct a N dimensional spliced vector by concatenating together $H_x$ feature vectors $f_x$ preceding the current point $X_i$, the feature vector $\vec{f}(X_i)$ at the current point, and the $H_x$ feature vectors succeeding $X_i$. This yields a spliced feature vector, $\vec{F}(x_i)$, of length:

$$N = n_y(2H_x+1).$$

A good choice for $H_x$ is 9.

10. Repeat Step 9 for $f_{cg}(x_i)$ to obtain $\vec{F}_{cg}(x_i)$. At the completion of Step 9, the input bitmap has been scanned in the x-axis dimension. Step 11 is next executed so as scan the bitmap in the y-axis dimension.

11. Repeat steps 2 through 6 and 8 through 9 for the y dimension, i.e. form horizontal slices at equispaced intervals along the y dimension. The corresponding values of δy and Δy are equal to those of δx and Δx, respectively. The width of the slice is also the same. It has been found that quantizing the horizontal slice to fewer levels than the vertical slice is preferable. An exemplary value for n is 6, with $H_y$ chosen to be 11.

This yields an analogous feature vector, $\vec{F}_y(Y_i)$.

Steps 12 through 19 are performed for each of the three classes of feature vectors, or codebooks, in a similar manner to that described above with respect to Step 6 through Step 14 of the dynamic feature vector extraction method.

12. Compute the mean vector and covariance matrix of all the spliced vectors of a given codebook. Denote these as $M_d$ and $S_d$, respectively.

13. Compute $E_d$, the eigenvector matrix of $S_d$, and $\Lambda_d$, the diagonal matrix of corresponding eigenvalues. It is noted that these quantities obey the relationship:

$$S_d = E_d \Lambda_d E_d^T,$$

where T denotes transposition. As a result, the leading eigenvectors in $E_d$ correspond to the leading eigenvalues in $\Lambda_d$.

14. Using the R leading eigenvectors from Step 13, project the N-dimensional feature vectors of Step 9 onto a space of dimension R. Call the resulting vectors $\vec{r}_i$. At this point the redundancy present in the N-dimensional spliced feature vectors has been reduced by concentrating on the most informative feature elements.

15. Starting with random cluster assignments, perform K-means Euclidean clustering of the projected vectors $\vec{r}_i$ obtained in Step 14 to obtain preliminary prototype distributions in the R-dimensional space, referred to as the chirographic space.

16. Starting with the preliminary prototype distributions of Step 15, perform K-means Gaussian clustering of the projected vectors obtained in Step 14, so as to obtain final Gaussian prototype distributions in the chirographic space. Denote these prototype distributions as $g_k$, and use cluster sizes to estimate the prior probability $Pr(g_k)$ of each prototype distribution.

17. Using the Gaussian distributions from Step 16, determine for all vectors $\vec{r}_i$ obtained in Step 14 the quantity $Pr(\vec{r}_i|g_k)$. Also estimate the probability of each feature vector as:

$$Pr(\vec{r}_i) = \sum_{k=1}^{K} Pr(\vec{r}_i|g_k)Pr(g_k)$$

assuming the total number of clusters is K.

18. Using the results of Steps 16 and 17, compute the quantity:

$$Pr(g_k|\vec{r}_i) = \frac{Pr(\vec{r}_i|g_k)Pr(g_k)}{Pr(\vec{r}_i)},$$

and note against which character $a_j$ each frame $\vec{r}_i$ is aligned in the training data.

19. For each character $a_j$ in the vocabulary considered, pool together all the $\vec{r}_i$ which have been aligned against it and accumulate the corresponding $Pr(g_k|\vec{r}_i)$. After normalization, this provides an estimate of $Pr(g_k|a_j)$, the prior probability of each prototype distribution given each character $a_j$.

The execution of Step 19 indicates the end of the training phase.

Decoding Phase

1. Splice the incoming data for a given writer to generate each class of the feature vectors, $F_x$, $F_y$ and $F_{cg}$ in the same fashion as described above. These classes are analogous to the codebooks described above with respect to the dynamic feature vector extraction method. The following Steps 2 through 4 are performed for each codebook.

2. Project onto a lower dimensional space as in Step 14 using the eigenvectors calculated in Step 13 of the training phase. This produces test feature vectors in the same chirographic space as the training data.

3. Using the Gaussian distributions from Step 16, as well as the prior probabilities from Step 19, determine, for all vectors obtained in the previous step, a single Gaussian mixture distribution covering the entire chirographic label alphabet. This is illustrated below for the codebook associated with the x slices i.e. $\vec{F}_x$:

$$Pr(r_i^x|a_j) = \sum_{k=1}^{K} Pr(r_i^x|g_k) Pr(g_k^x|a_j).$$

4. By multiplying the scores of successive frames within the block of image data under analysis there is obtained the overall likelihood score for that block, thus completing the decoding process for a given codebook; i.e.

$$Pr(s_d^x|a_j) = \prod_{i: \to r_i^x \in s_d} Pr(r_i^x|a_j)$$

where $s_d$ represents a block of image data.

5. The final a posteriori probability for a block $s_d$ given a character $a_j$, and considering the contribution of all three codebooks, is given by:

$$Pr(s_d|a_j) = Pr(s_d^x|a_j)^{1/3} Pr(s_d^y|a_j)^{1/3} Pr(s_d^{cg}|a_j)^{1/3}.$$

Combination of Static and Dynamic Scores (Overall Likelihood Estimator 28c). Discrete character case (W1 and W2 of FIG. 1)

In that segmentation is implicit in this method, the output of the static recognizer, at the character level, can be employed to estimate the a posteriori probability of the entire unknown character U. Then $s_d$, as described above, encompasses the entire character. This can be combined with the a posteriori probability of the unknown character using the dynamic features by assuming that the two sources of information are independent. The additional information is treated as arising from an independent codebook. Thus, $$Pr(U|a_j) = Pr(U_s|a_j)^{1/2} Pr(U_d|a_j)^{1/2},$$

where $Pr(U_d|a_j)$ is determined as in Step 5 of the Decoding Phase set forth above, and where $Pr(U_s|a_j)$ is determined as described in Step 16 of the dynamic method. Note that it is not necessary to weight the static and dynamic contribution equally.

Unconstrained character case.

In the more general case, it is not generally possible to obtain a segmentation of the input stream that is natural for both the static and the dynamic portions of the front-end parameter extraction block 22. As such, the following technique may be used.

1. Perform the dynamic decoding as set forth above for the dynamic feature vector extraction case on all available input frames $w_t$, and obtain $Pr(w_t|a_j) \forall j, \forall t$.

2. Process the image data by blocks generating $Pr(s_d|a_j) \forall j$ for each block using the static character model.

3. For each block s identify all of the frames $w_t$ that lie within that image block.

4. Define $$Pr(s_i|a_j) = \left( \prod_{t: w_t \in s} Pr(w_t|a_j) \right)^{1/T},$$

where T is the number of frames of $w_t$ within s.

5. The a posteriori probability of an image block s given $a_j$ can then be written as:

$$Pr(s|a_j) = Pr(s_i|a_j)^{\alpha} Pr(s_d|a_j)^{1-\alpha}.$$

Reference is now made to FIG. 4 which is a detailed block diagram of the front-end parameter extraction block 22 that is shown generally in FIG. 3. The parameter extraction block 22 includes two processors 22a and 22b that operate in parallel with one another, with processor 22a performing dynamic parameter extraction and processor 22b performing static parameter extraction. The operation of the dynamic processor 22a is described first.

Each sampled point of handwriting is represented by a point which is defined by coordinates $x_n$ and $y_n$. This coordinate pair is provided to a pre-filtering block 34, which performs step 1 of both the dynamic and the static handwriting recognition methods set forth above. The points are ballistically spaced as shown in FIG. 5. That is, the spacing of the points is a function of the velocity or speed of writing which the writer used to form the current character. For a variety of reasons, writers are seldom consistent in their velocity or writing speed, which may introduce high error rates in handwriting recognition. The pre-filtering block 34 normalizes the points of FIG. 5 to provide equally spaced points $x_m$ and $y_m$ comprising a character, as shown in FIG. 6. Points $x_m$ and $y_m$ are recognition method for providing the vector $\vec{v}_m$. Details provided to a dynamic parameter extraction block 36a, which performs Steps 2 and 3 of the dynamic handwriting to FIGS. 11, 12, 13 and 14. The vector $\vec{v}_m$ is provided to of this parameter extraction are described below relative a windowing block 38a, which performs Steps 4 and 5 of the dynamic handwriting recognition method, for providing a spliced vector $\vec{S}_i$. Details of how the spliced vector $\vec{S}_i$ is provided is described below relative to FIGS. 14, 15, and 16. The spliced vector $\vec{S}_i$ is provided to a projection block 40a, which performs Steps 6–9 of the dynamic handwriting recognition method, for producing a feature vector $\vec{r}_i$. This eliminates redundancy in the spliced parameter vectors. Details of the function of block 40a are set forth relative to FIG. 17. Projection block 40a responds to the spliced vector $\vec{S}_i$ to provide a feature vector $\vec{r}_i$ which is provided to the dynamic prototype construction block 24a and the dynamic likelihood estimator 28a, as previously explained with respect to FIG. 3. Details of projection block 40a are set forth relative to the flow chart of FIG. 17.

Figure 7:
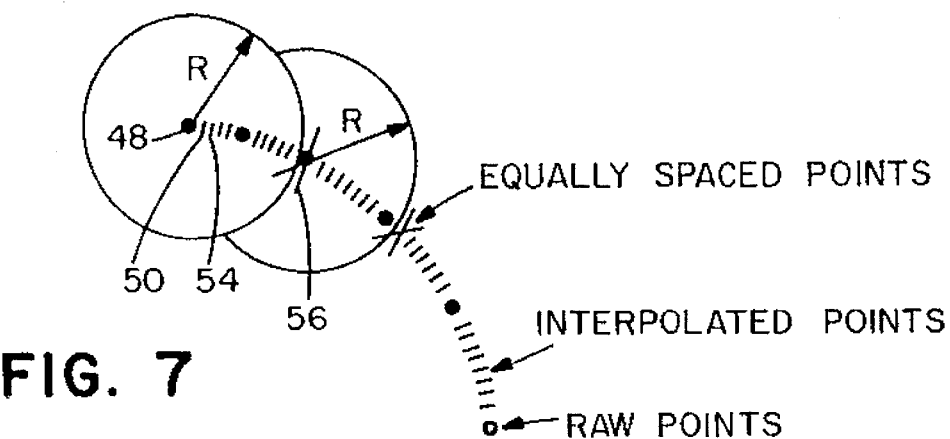
FIG. 7 illustrates how the top ¼ of the ballistically spaced character of FIG. 5 is transformed to the equally spaced character of FIG. 6.
Figure 8:
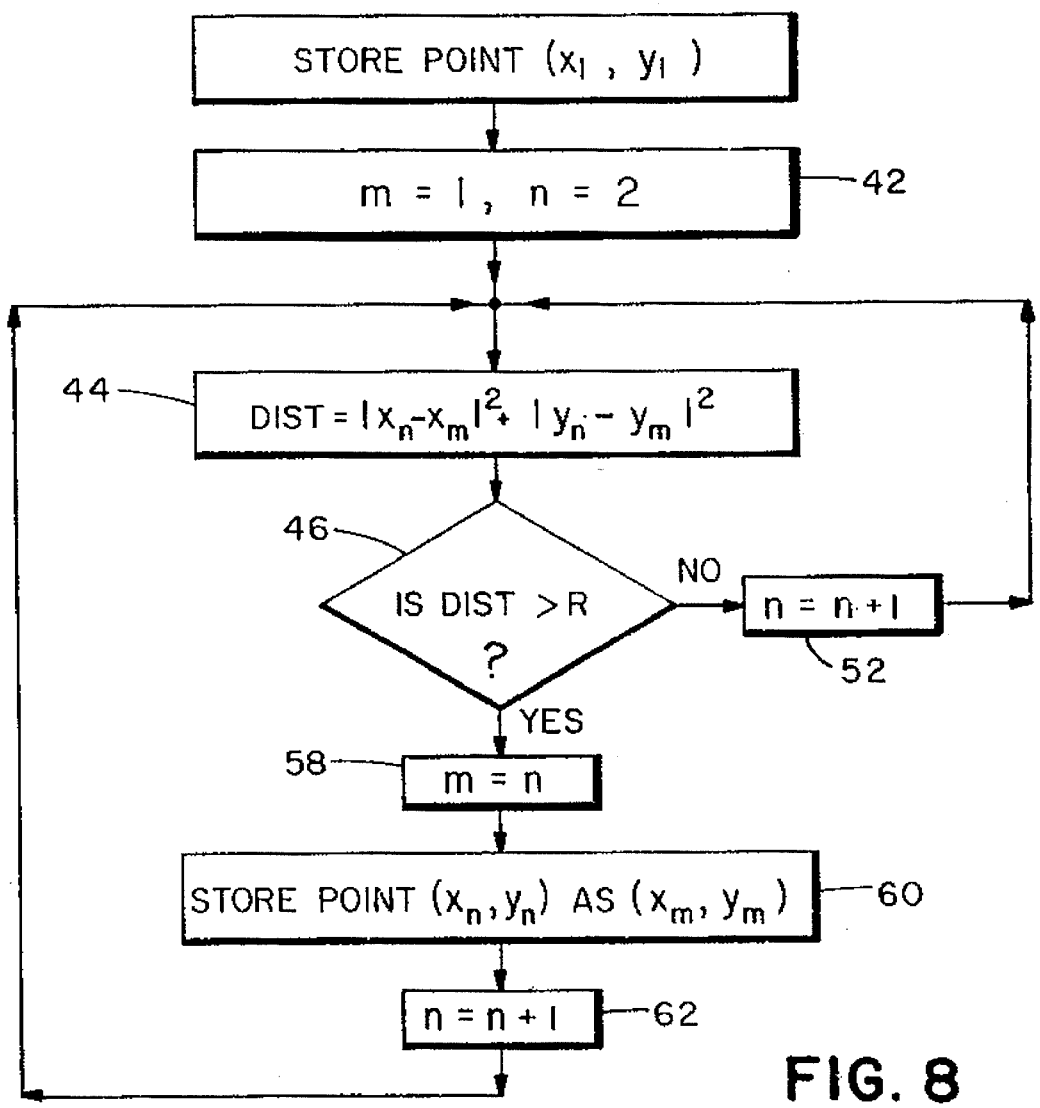
FIG. 8 is a flow chart detailing how the pre-filtering block of FIG. 4 functions to transform the ballistically spaced character of FIG. 5 to the equally spaced character of FIG. 6.

Details of how the ballistically spaced character of FIG. 5 is normalized by pre-filtering block 34 (FIG. 4) to produce the equally spaced character of FIG. 6 is now explained relative to FIGS. 7 and 8, which illustrate how Step 1 of the handwriting recognition method is performed. FIG. 7 is representative of the upper ¼ curved portion of FIG. 5. First, the density of points is increased by performing some interpolation between the original raw points (denoted by a dot). This results in a sequence of points comprising the set of original raw points (•) and the interpolated points (|). Then, filtering is accomplished by a priori determining that equal spacing between points is a distance r suitably related to the distance between two pels as manifested on the electronic tablet 14 (FIG. 3). In FIG. 7, this results in a sequence of points, after filtering, denoted by an X (at 56). Raw and interpolated points are considered to be at equally-spaced integer points n, and filtered points are considered to be at equally-spaced integer points m.

With respect to FIG. 8, at block 42 the position at n=1 at the first (raw) point 48 of the stroke is designated as m=1, considered also the first filtered point. The second point 50 of the stroke at n=2 is the first point to be tested for filtering. At block 44 the (Euclidean) distance between the points m and n is determined according to the relationship:

$$\text{distance} = |x_n - x_m|^2 + |y_n - y_m|^2$$

Figure 11:
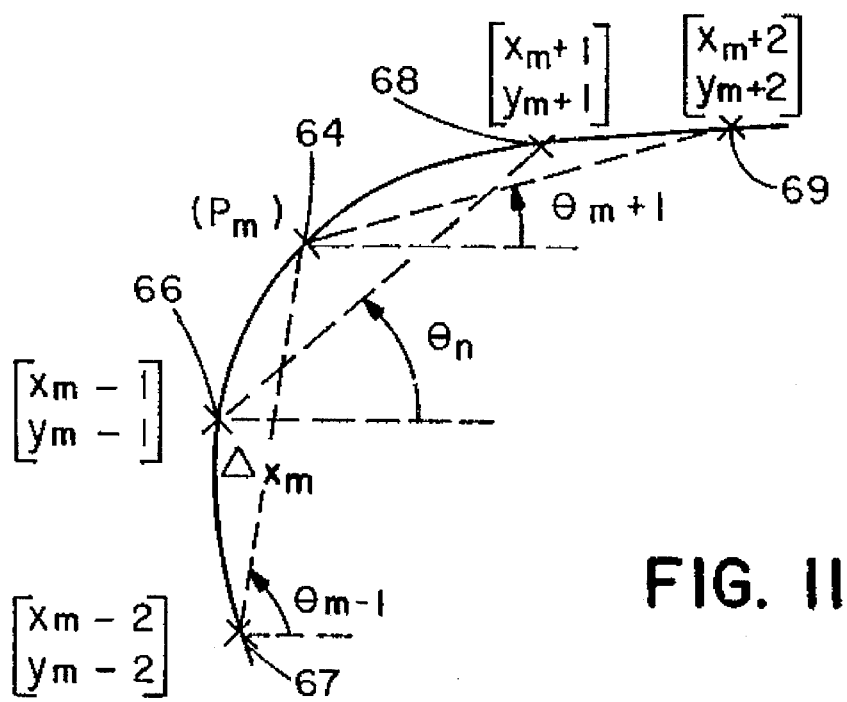
FIG. 11 illustrates a portion of a handwritten character being processed to generate a first parameter vector for a point (P)
Figure 13:
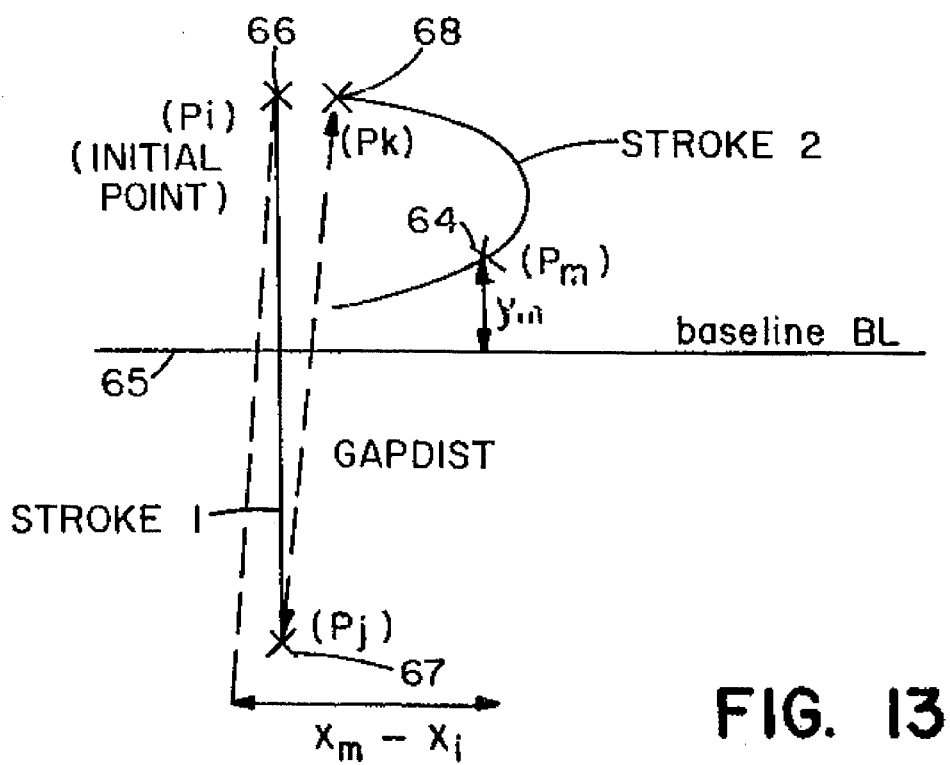
FIG. 13 illustrates a handwritten character being processed to generate a second parameter vector for a point (P)

At block 46 a determination is made as to whether the determined distance is greater than R. With reference to FIG. 7, point m=1 is point 48 and point n=2 is point 50. It can be seen that distance is less than R in FIG. 7, therefore the point is rejected and the method proceeds to block 52 where n is incremented to 3, point 54. Distance is again computed in block 44 and compared with R in block 46. Eventually the distance becomes greater than R, so the point 56 is accepted (m is made equal to n in block 58). At block 60 the point $(x_n, y_n)$ is stored as a filtered point $(x_m, y_m)$, point 56, which is the 12th point. At block 62 n is incremented by 1, and a return is made to block 44 where raw and interpolated points are treated as explained above. FIGS. 11, 12, 13 and 14 illustrate how parameter extraction, block 36a of FIG. 4, which performs Steps 2 and 3 of the dynamic handwriting recognition algorithm, is derived for providing a parameter vector $\vec{v}_m$. FIG. 11 shows the local parameter extraction, FIG. 12 the local parameter vector, FIG. 13 is the global parameter extraction, and FIG. 14 the global parameter vector. There are 6 local coordinates in the local parameter vector and 3 global coordinated in the global parameter vector, for a total of 9 coordinates. For the local parameter vector, calculations are made relative to a current point 64 relative to previous points 66 and 67 and following points 68 and 69. The specific calculation for local parameter vectors are shown in FIG. 12. For the global parameter vector, calculations are made relative to a current point 64 relative to baseline 65, initial point of the character 66, last point of the first stroke 67, and first point of the second stroke 68. The specific calculation for global parameter vector are shown in FIG. 14. Without loss of generality, the ensuing description illustrates the handwriting recognition method for one codebook only, i.e., either the local parameter vectors or the global parameter vectors.

Figure 15:
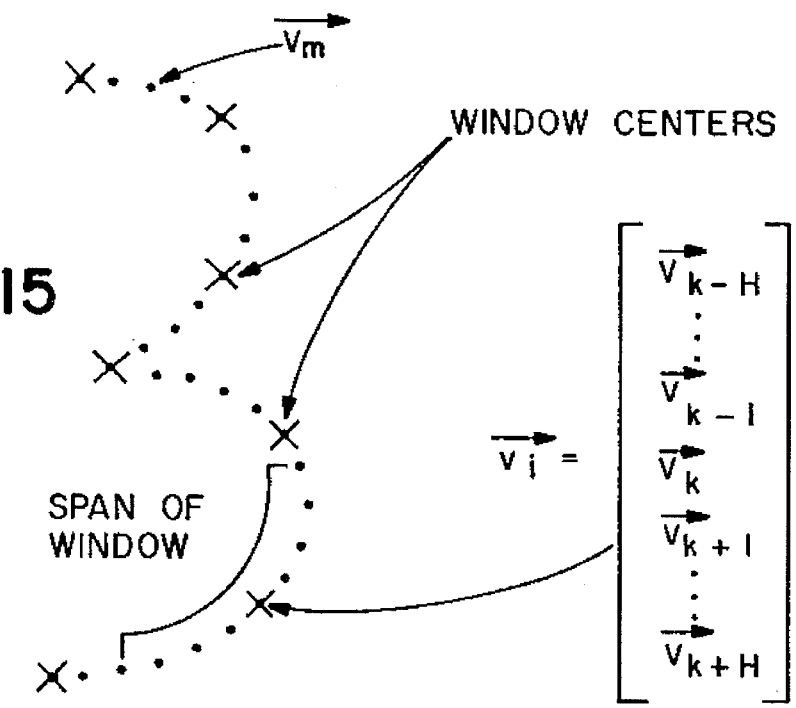
FIG. 15 illustrates how windowing is accomplished on a character by concatenation of individual parameter vectors as extracted in FIG. 12 and 14.
Figure 16:
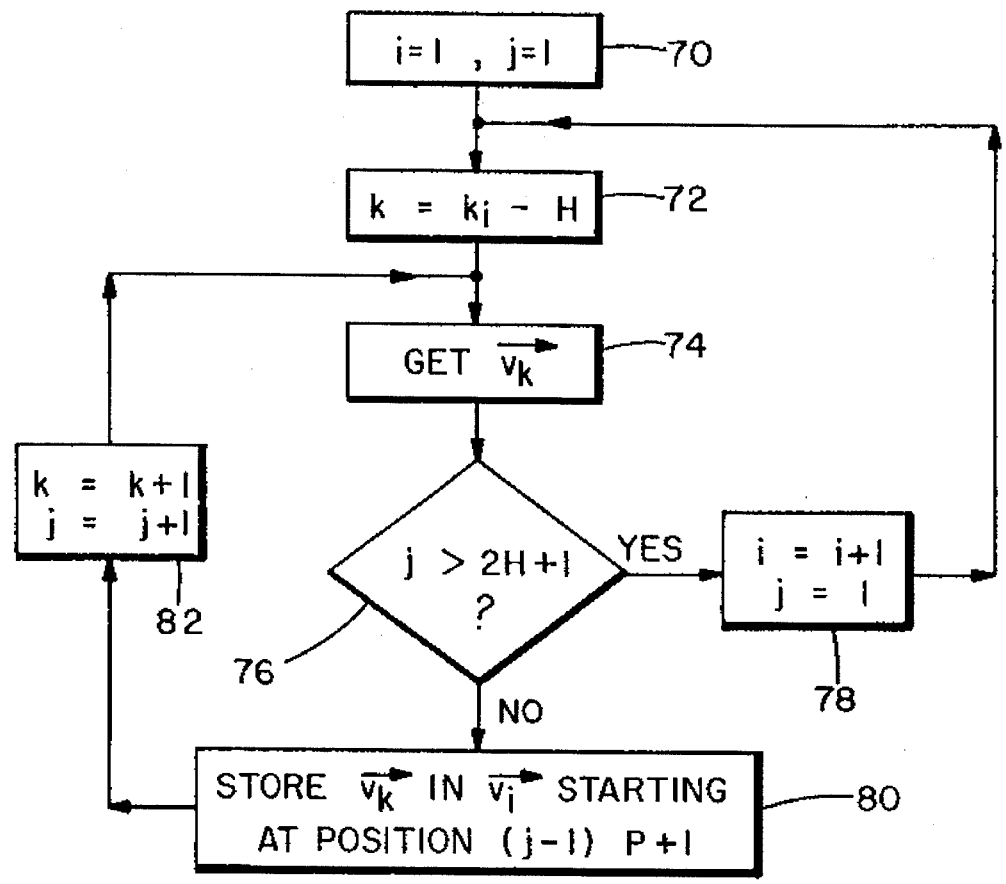
FIG. 16 is a flow chart detailing how the windowing block of FIG. 4 functions to perform the concatenation of the parameter vectors illustrated in FIG. 15 and thereby produce spliced vectors.

Details of the windowing block 38a of FIG. 4 are now set forth relative to FIGS. 15 and 16 to show how feature events are extracted from the data. A small number of approximately equidistant feature points are determined using the same algorithm as in FIG. 8, but with a different value of R, and parameter vectors are spliced at those points. The number (2H+1) of parameter vectors to be spliced at each point is determined a priori, which in turn specifies the splicing dimension Q=(2H+1)P.

Referring to FIG. 15, feature points are shown by dots, and window centers are shown by an X. Dots are referenced as points k, and X's are referenced by index i as points $k_i$. With respect to FIG. 16, at block 70 i and a counter j are each set equal to 1. At block 72, k is set to $k_i$–H and at block 74 the corresponding $\vec{v}_k$ (of dimension P) is obtained. A determination is then made at block 76 whether or not (2H+1) $\vec{v}_k$ have been seen. If so, j is reinitialized to 1 and i is incremented by 1 in block 78 and the procedure repeats as just explained. If not, $\vec{v}_k$ is appended to $\vec{V}_i$ starting at position (j-1) P+1. k and j are both incremented by 1 in block 82 and a return is made to block 74 to get the next $v_k$, and the procedure repeats as just explained.

Figure 17:
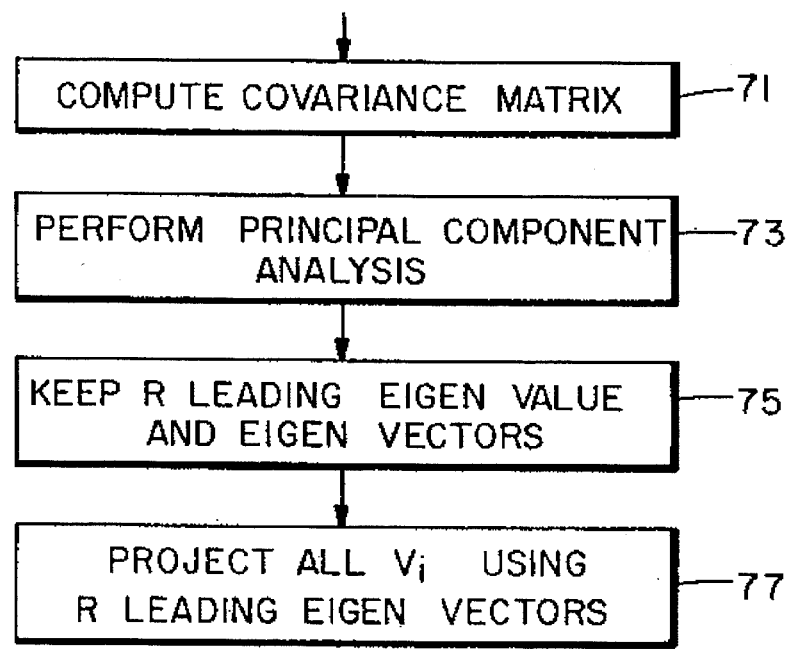
FIG. 17 is a flow chart detailing how the projection block of FIG. 4 functions to produce a feature vector from the spliced vectors obtained in FIG. 16.

Referring to FIG. 17 the function of the projection block 40a of FIG. 4, which performs steps 6–9 of the dynamic handwriting recognition method, is explained in detail. The projection block is utilized to eliminate redundancy in the splice parameter vectors from the windowing block 38. A covariance matrix is computed for all spliced vectors in block 71, and the associated eigenvalue and eigenvectors are found through principal component analysis, in block 75. Using the R leading eigenvalues and eigenvectors of block 75, the spliced vectors are projected in block 77 onto a subspace of smaller dimension called chirographic space, resulting in the projected vectors $\vec{r}_i$. How a covariance matrix is computed is described in "Matrix Computations" by J. H. Golub and C. F. Van Loan, John Hopkins, University Press, Baltimore, 1989. This reference also teaches how to perform a principal component analysis at block 73, and how to project all $S_i$ at block 77.

Figure 18:
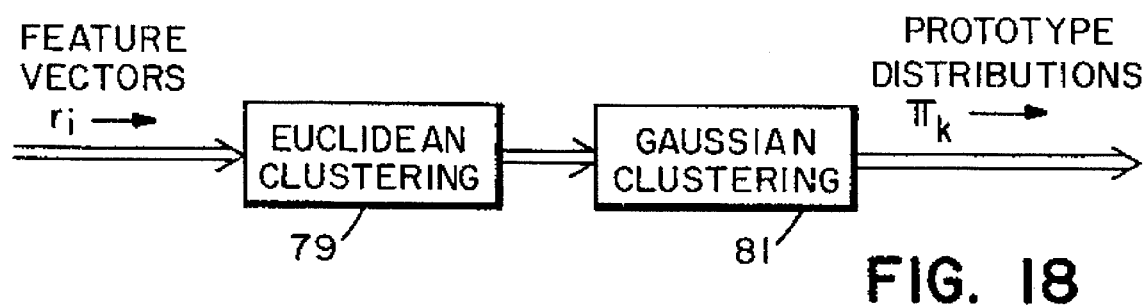
FIG. 18 is a detailed block diagram of the dynamic prototype construction block of FIG. 3.
Figure 19:
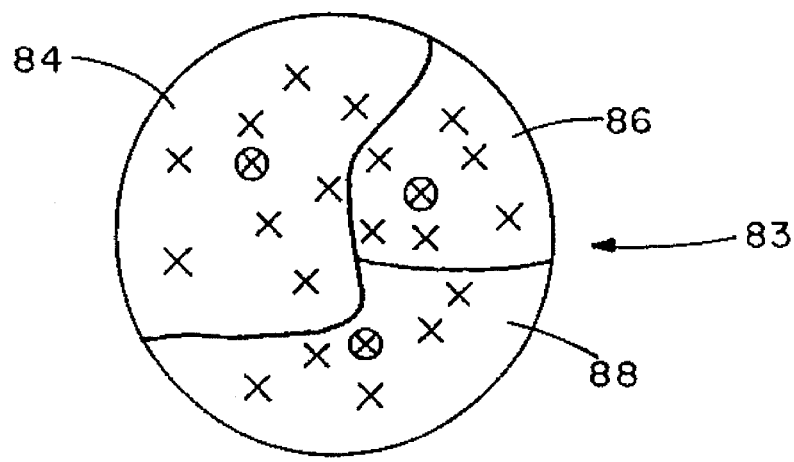
FIG. 19 is a diagram illustrating K-means clustering.

The chirographic space is then partitioned as shown in FIG. 18 and 19, which details the prototype construction block 24a of FIG. 3, to produce chirographic prototypes. The feature vectors are provided to block 79 to perform k-means Euclidean clustering. Details of block 79 are set forth relative to FIGS. 19 and 20. The results of Euclidean clustering are provided to block 81 to perform k-means Gaussian clustering to provide prototype distributions $\pi_k$. Details of block 81 are set forth relative to FIG. 21. FIGS. 18–21 detail how steps 10 and 11 of the dynamic handwriting recognition method are performed.

The prototype distributions or chirographic prototypes are provided to the dynamic likelihood estimator 28a (FIG. 3) to produce candidate characters to decoder 30 (FIG. 3), if operating only with dynamic feature vectors, or to provide input to the overall likelihood estimator 28c if operating with joint static and dynamic feature vectors.

How to generally accomplish k-means clustering is described in "Clustering Algorithms" by J. A. Hartigan, J. Wiley, 1975.

FIG. 19 illustrates a space 83 which is divided into clusters 84, 86 and 88. Each cluster includes a plurality of vectors indicated as points x, with a centroid ⊗ being computed for each such cluster of vectors.

Figure 20:
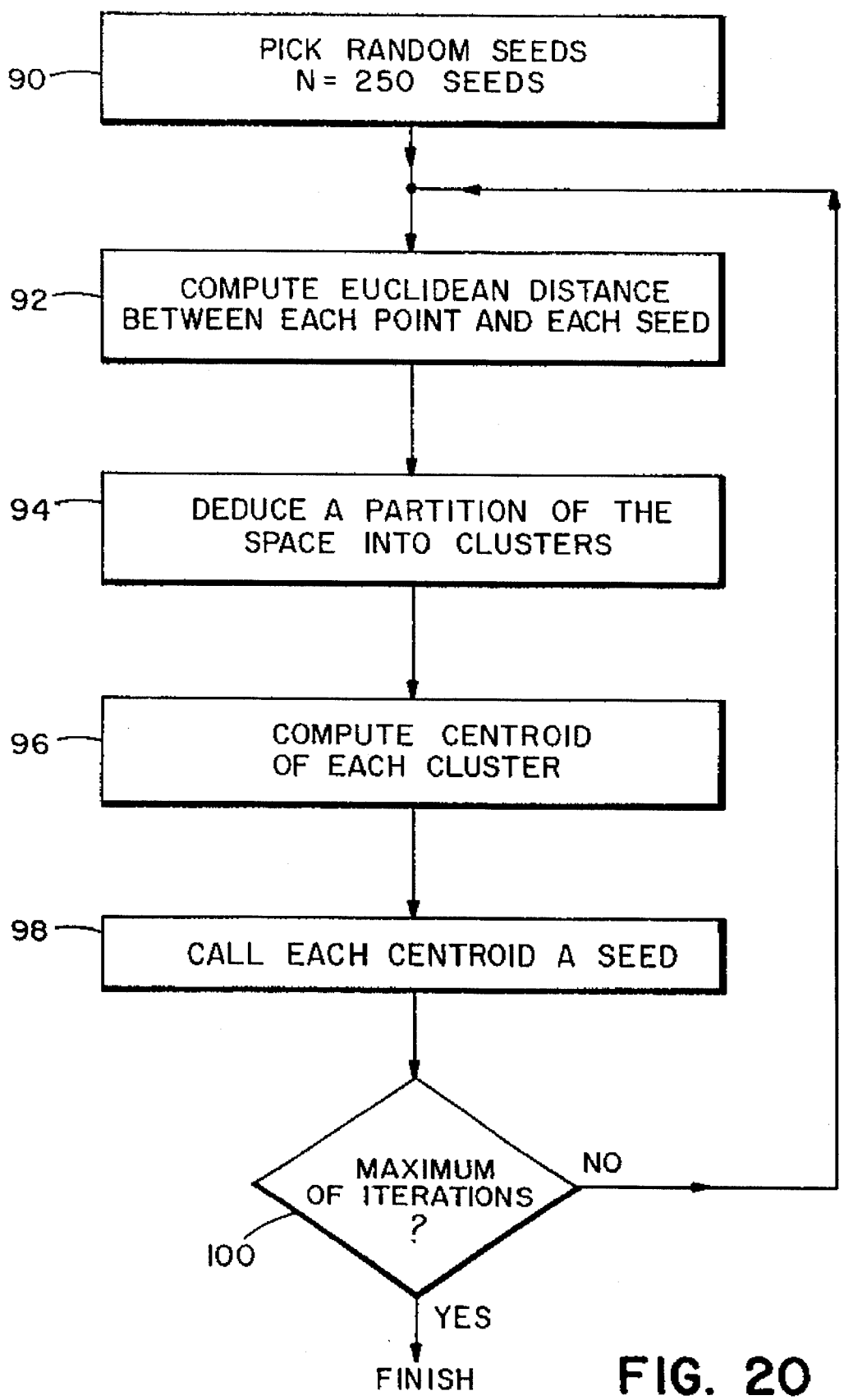
FIG. 20 is a flow chart detailing how the Euclidean K-means clustering block of FIG. 18 functions.

FIG. 20 details block 79 of FIG. 18. A number of random seeds, chosen to be 250, is picked at block 90 from all points in the chirographic space obtained from block 22 in FIG. 3. The Euclidean distance between each point and each seed is calculated at block 92. By assigning each point to its closest seed, the space is partitioned into clusters at block 94. This corresponds to the clusters 84, 86 and 88 of FIG. 19. The centroid of each cluster is computed at block 96. This corresponds to the ⊗ in FIG. 19. These centroids are set to replace the original seeds at block 98. At decision block 100 a determination is made if the maximum number of iterations is reached. If not, a return is made to block 92 and the steps are repeated as just described. If so, the calculation of the Euclidean clustering is complete.

Figure 21:
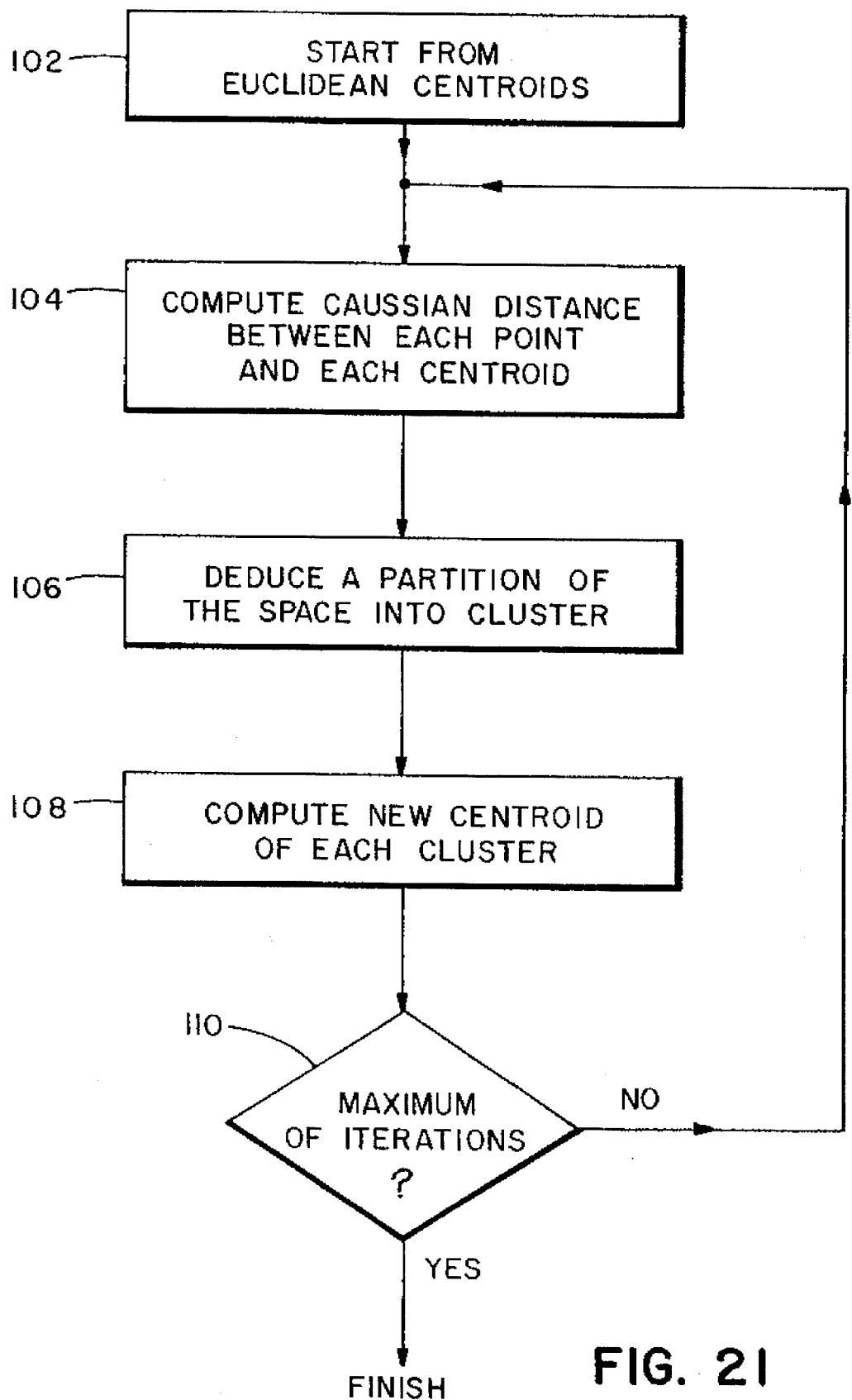
FIG. 21 is a flow chart detailing how the Gaussian K-means clustering block of FIG. 18 functions.

Reference is now made to FIG. 21 which details the Gaussian clustering block 81 of FIG. 18. The Euclidean clusters obtained in block 79 (FIG. 18) are provided at block 102. The Gaussian distance between each point and each centroid is calculated at block 104. By assigning each point to its closest centroid, the space is partitioned into clusters at block 106. The new centroid of each cluster is computed at block 108. At decision block 110 a determination is made if the maximum number of iterations is complete. If not, a return is made set to replace the original seeds at block 98 (FIG. 20). At decision block 100 a determination is made if the maximum number of iterations is reached. If not, a return is made to block 92 and the steps are repeated as just described. If so, the calculation of the Euclidean clustering is complete.

Reference is made to FIG. 21 which details the Gaussian clustering block 81 of FIG. 18. The Euclidean clusters obtained in block 79 (FIG. 18) are provided at block 102. The Gaussian distance between each point and each centroid is calculated at block 104. By assigning each point to its closest centroid, the space is partitioned into clusters at block 106. The new centroid of each cluster is computed at block 108. At decision block 110 a determination is made if the maximum number of iterations is complete. If not, a return is made to block 104 and the steps are repeated as just described. If so, the calculations of the Gaussian clustering is complete. This results in final prototype distributions in chirographic space.

Figure 22:
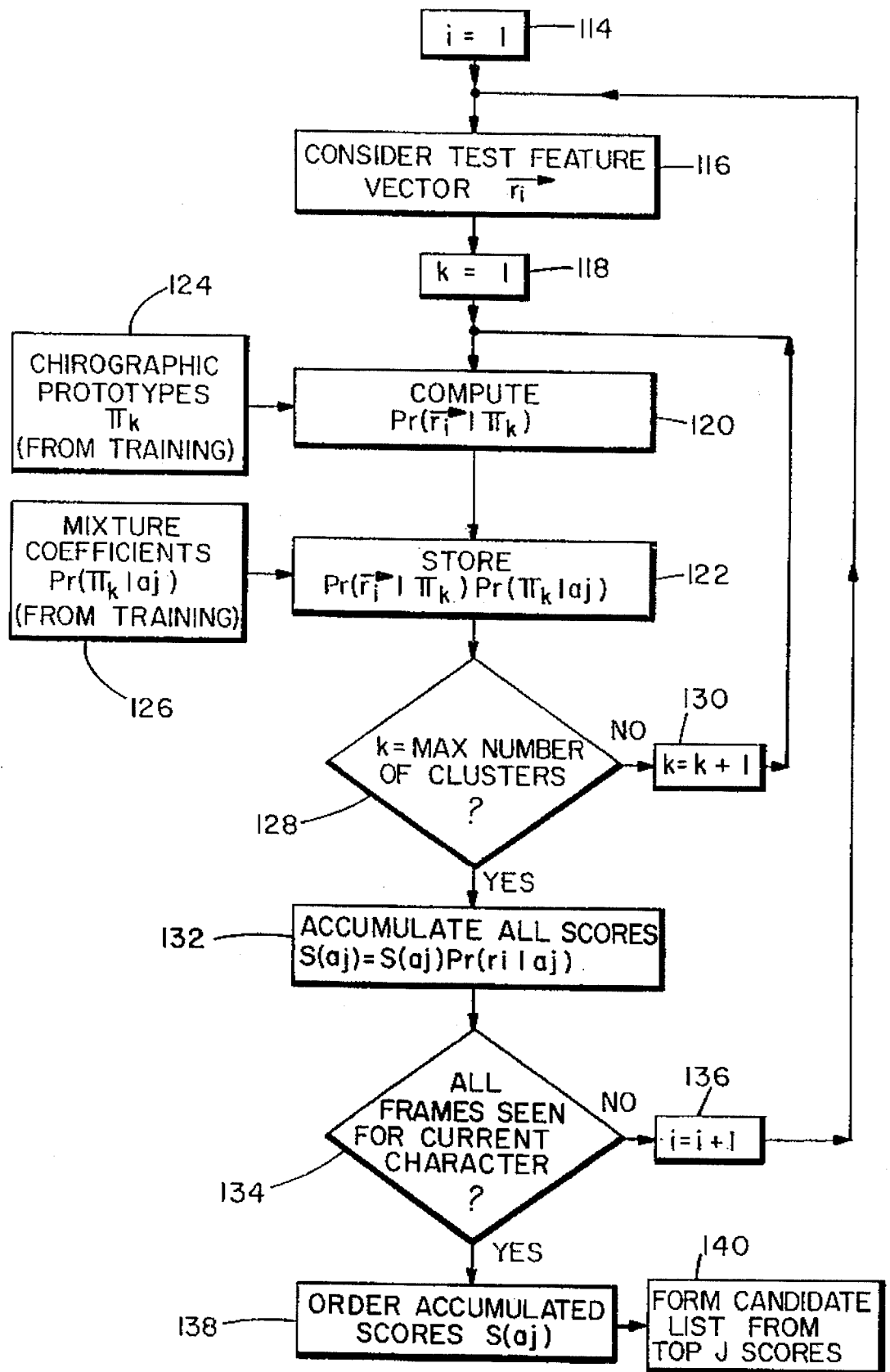
FIG. 22 is a flow chart detailing how the dynamic likelihood estimator block of FIG. 3 functions.

Refer to FIG. 22, which performs step 16 of the handwriting recognition technique for one codebook only, and which illustrates how information resulting from steps 12 and 13 of the dynamic handwriting recognition method is operated on by the dynamic likelihood estimator 28a of FIG. 3 to produce candidate characters for the decoder 30. At block 114 a variable i, which is indicative of the current frame (or window center), is initialized to 1, and the dynamic test feature vector is provided from the front end parameter extraction 22 (FIG. 4) as indicated at block 116. At block 118 a variable k representative of the current prototype distribution is initialized to k=1. The conditional probability of this feature vector given this prototype distribution is computed at block 120 and is provided to block 122.

The prototype construction block 24a (FIG. 3) of the training phase as represented by the chirographic prototype distributions $\Pi_k$ in block 124 and mixture coefficients $Pr(\Pi_k|a_j)$ in block 126 are also provided to block 122 where the combined probability is computed and stored. At decision block 128 a determination is made if k has reached the maximum number of clusters. If not, k is incremented by 1 as indicated at block 130, and a return is made to block 120 and the just recited process is repeated. If so, the scores just stored are accumulated at block 132 for all characters $a_j$ in the underlying alphabet. At decision block 134 a determination is made if all frames i have been seen for the current character under consideration. If not, i is incremented by 1 at block 136 and a return is made to block 116 and the just recited process is repeated. If so, the accumulated scores are ordered in block 138 and a candidate list of characters $a_j$ is formed from the top J scores for provision to the decoder 30 (FIG. 3).

Figure 23:
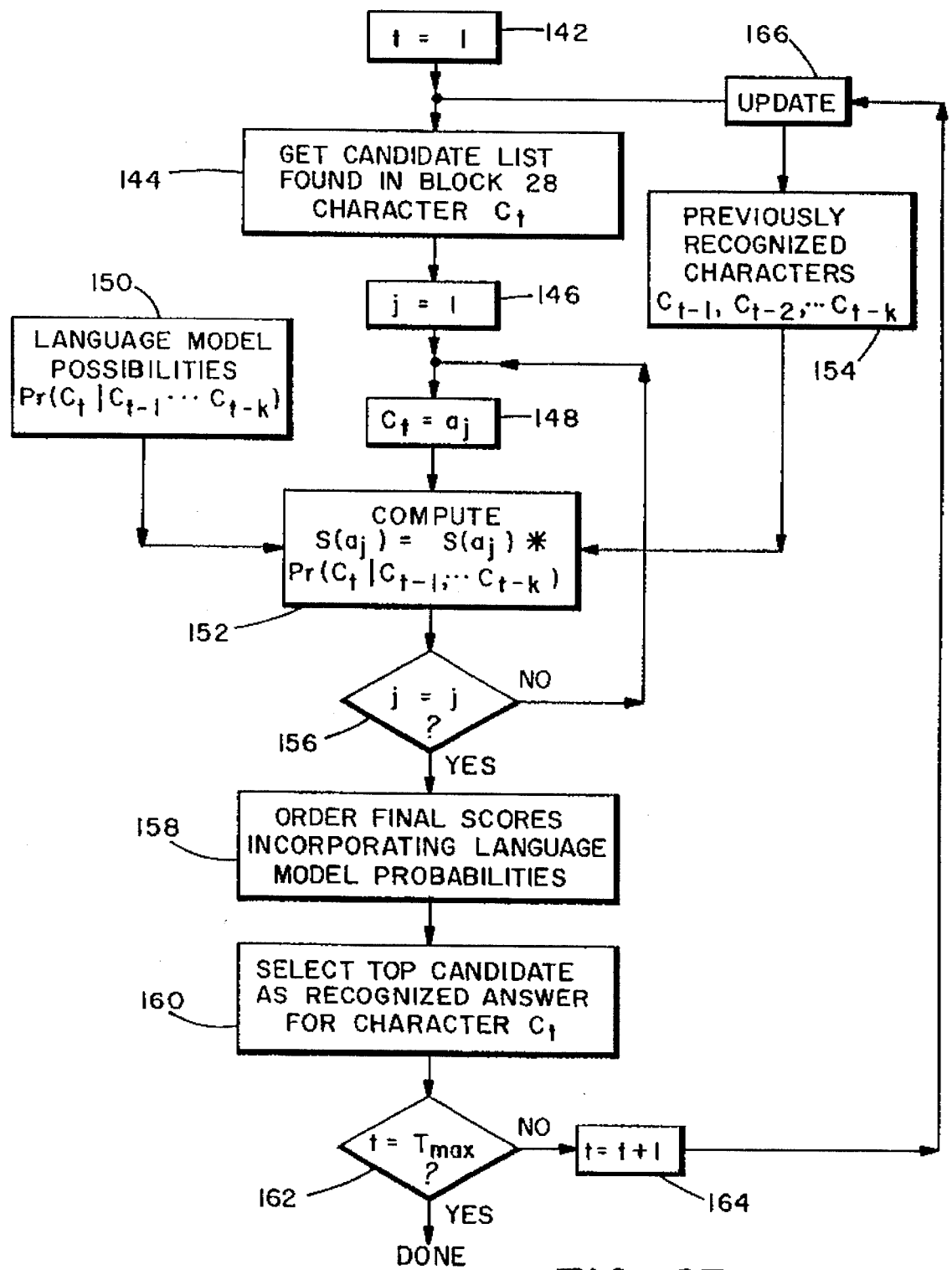
FIG. 23 is a flow chart detailing how the decoder block of FIG. 3 functions for the case of dynamic feature vectors.

Refer now to FIG. 23 which is a flow chart representation indicative of the operation of the decoder 30 (FIG. 3) for the case of decoding only the output of the dynamic likelihood estimator 28a of FIG. 3. A variable t, which is indicative of the current character under consideration, is initialized to 1 at block 142. The candidate list of characters from the likelihood estimator 28a (FIG. 3) for character $C_t$ is provided at block 144. A variable j indicative of the current candidate character is initialized to 1 at block 146, and $C_t$ is tentatively set equal to $a_j$ at block 148. From the training block, Language Model probabilities 26 (FIG. 3) are provided at block 150. Based on these probabilities and previously recognized characters at block 154, the final score of the character $a_j$ is computed at block 152. This score represents the likelihood that $C_t$ is recognized as $a_j$ taking into account the contextual information through the language model. At decision block 156 a determination is made if j=J, the index of the last candidate character in the candidate list provided by the likelihood estimator 28. If not, a return is made to block 148 and the just recited process is repeated. If so, final scores incorporating language model probabilities are ordered in block 158. The top candidate is selected as the recognized answer for character C in block 160. At decision block 162 a determination is made if t=Tmax, the index of the last character in the string to be recognized. If not, t is incremented by 1 in block 164, to get the next character to be recognized. An update is made at block 166, to insert the recognized $C_1$ in block 154, and a return is made to block 144, with the just recited process being repeated. If so, the process is complete as indicated at block 168 and the whole string of characters has been recognized.

Having described in detail the operation of the dynamic parameter extraction and evaluation functions of the handwriting recognizer of FIG. 3, it is noted that Steps 1 and 12–19 of the static determination operate in the same manner, as do the corresponding blocks of the static processor 22b of FIG. 4.

It is further noted that the Steps 2–11 of the static determination method are not limited for use only with on-line handwriting systems, but may be employed to advantage in off-line systems wherein the input signals are not generated in real time. As an example, the spatially-based feature vector determination can be used in Optical Character Recognition systems wherein a printed text is scanned and converted to a digital format. Individual characters of the input may be processed to derive feature vectors, based on the shape of the characters, for subsequent recognition.

Two separate tasks were selected to evaluate the handwriting recognition method that employs both static and dynamic processes. In the first task, eight writers were considered as part of a writer dependent experiment. The recognizer was trained on data from a particular writer and then tested on an independent data set derived from the same writer. The second experiment was designed to ascertain the performance of the system in a writer independent mode. Data from all eight writers were pooled together and used to train the recognizer. The system was then tested on a set of four new writers that the recognizer had not been exposed to. The test characters are drawn from the full 81 character (letter/digit/special symbols) set. Each test set consists of approximately 800 discrete characters. Recognition accuracy was measured for three different recognition techniques: the dynamic parameterization technique described above, the static parameterization described above, and a combination of these two methods. These results are summarized below, wherein Table 1 is for the writer dependent the case and Table 2 for the writer independent case.

TABLE 1

Recognition results for the writer-dependent case.

| writer | Dynamic % err. | Dynamic # err. | Static % err. | Static # err. | Both % err. | Both # err. |
|---|---|---|---|---|---|---|
| MAR | 5.6% | 45 | 7.0% | 56 | 4.4% | 35 |
| HIL | 12.8% | 103 | 12.1% | 97 | 7.6% | 61 |
| VIV | 11.1% | 89 | 11.0% | 88 | 3.7% | 30 |
| JOA | 8.7% | 70 | 9.2% | 74 | 5.9% | 47 |
| ACY | 15.1% | 121 | 18.0% | 145 | 10.6% | 85 |
| NAN | 8.8% | 71 | 12.2% | 98 | 7.2% | 58 |
| LOY | 5.4% | 43 | 7.2% | 58 | 3.6% | 29 |
| SAB | 6.0% | 48 | 5.7% | 46 | 3.2% | 26 |
| TOTAL | 9.2% | 590 | 10.3% | 662 | 5.8% | 371 |

TABLE 2

Recognition results for the writer-independent case.

| writer | Dynamic % err. | Dynamic # err. | Static % err. | Static # err. | Both % err. | Both # err. |
|---|---|---|---|---|---|---|
| MAL | 23% | 184 | 24% | 196 | 15% | 122 |
| BLA | 19% | 153 | 19% | 154 | 11% | 92 |
| SAM | 26% | 207 | 24% | 192 | 15% | 123 |
| WAR | 10% | 77 | 10% | 80 | 4% | 31 |
| TOTAL | 19% | 621 | 19% | 622 | 11% | 368 |

The Tables show that although individually the dynamic and static front-end parameter extraction block 22 results in recognition rates, the joint use of static and dynamic information results in a significant reduction in the error rate. There is also observed a consistent drop in error rate across all writers. Clearly, the static and dynamic information complement one another. This is borne out by analysis of the confusion matrices. The static system was found to out perform the dynamic system for upper case characters, while the dynamic system tends to make fewer errors for lower case characters. In both instances, nevertheless, fewer errors result when both systems are incorporated into the recognizer, than with either the static or dynamic front end alone.

Thus, while the invention has been particularly shown and described with respect to presently preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for processing input signals representative of a hand written character, the input signals being generated by a handwriting transducer in response to a writer and being ordered as points each having an x-axis coordinate value and a y-axis coordinate value, comprising the steps of:

coupling a handwriting processor to an output of the handwriting transducer for receiving the input signals;

operating the handwriting processor to execute the steps of, (a) sorting points received from the input signals in terms of x-axis values;

(b) sampling along the x-axis at intervals of $\delta x$ to provide a sequence of the form $\{x_i\}$, where $x_i = x_{i-1} + \delta x$;

(c) defining, for each sample point $x_i$, a slice of width lw centered on that sample and associating all y-axis values within the width of the slice with that sample, thereby yielding a vector of the form $\vec{y}(x_i)$;

(d) quantizing a range of y-axis values to $n_y$ equispaced levels, $l_k$, and assigning, for each $x_i$, all associated y-axis values to one level in accordance with the expression:

$$y \in l_k \Leftrightarrow l_{k-1} \Delta l < y < l_k \Delta l,$$

where $\Delta l = (y_{max} - y_{min})/n_y$;

(e) constructing a bitmap of the slice having a grid size $n_y$, the step of constructing including a step of determining, for each $x_i$, a first feature vector $\vec{f}_x(x_i)$ of length $n_y$, such that the kth element is one if at least one y-axis value was assigned to $l_k$, and zero otherwise;

(f) constructing, for each $x_i$, a second feature vector of length 1, $f_{cg}(x_i)$ such that:

$$f_{cg}(x_i) = \frac{1}{J} \sum_{j=1}^{J} y_j(x_i),$$

where the summation is over all y-axis values within the slice associated with $x_i$;

(g) determining a subset of points of $\{x_i\}$ such that the points are spaced ax apart, the subset of points being defined as $\{X_i\}$;

(h) constructing, at each location $X_i$, an N dimensional spliced vector by concatenating together $H_x$ feature vectors $f_x$ preceding a current point $X_i$, a feature vector $\vec{f}(X_i)$ at the current point, and $H_x$ feature vectors succeeding $X_i$ to yield a spliced feature vector, $\vec{F}(x_i)$, of length:

$$N = n_y(2H_x + 1);$$

(i) repeating Step (h) for $f_{cg}(x_i)$ to obtain $\vec{F}_{cg}(x_i)$;

(j) repeating steps (a) through (e) and (g) through (h) for the y-axis dimension to obtain a feature vector, $\vec{F}_y(Y_i)$; and further operating the handwriting processor to determine a most probable identification of the writer's handwriting in accordance with the obtained feature vectors.

2. A method as set forth in claim 1 wherein the step (e) further includes a step of encoding dynamic information by defining three possible states for each element of $f_x(x_i)$, wherein a first state is (0,0) in the absence of a point, a second state is (−d,1) for a point with a first predetermined stroke direction, and a third state is (d,1) for a point with a second predetermined stroke direction.

* * * * *

UNITED STATES PATENT AND TRADEMARK OFFICE
CERTIFICATE OF CORRECTION

PATENT NO. : 5,544,261
DATED : August 6, 1996
INVENTOR(S) : Bellegarda et al.

It is certified that error appears in the above-identified patent and that said Letters Patent is hereby corrected as shown below:

In col. 18, claim 1, line 33, "ax" should be --Δx--.

Signed and Sealed this

Fifth Day of November, 1996

Attest:

BRUCE LEHMAN

*Attesting Officer*  *Commissioner of Patents and Trademarks*